Aug. 7, 1956 R. J. KULISCH 2,757,725
SCREEN FOR AUTOMOBILE DOOR WINDOW VENTS
Filed May 18, 1954 2 Sheets-Sheet 1
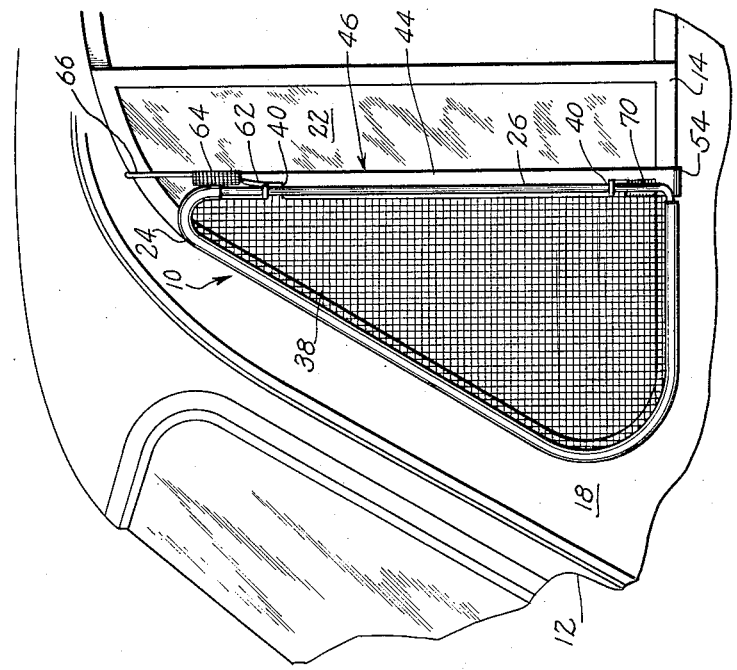
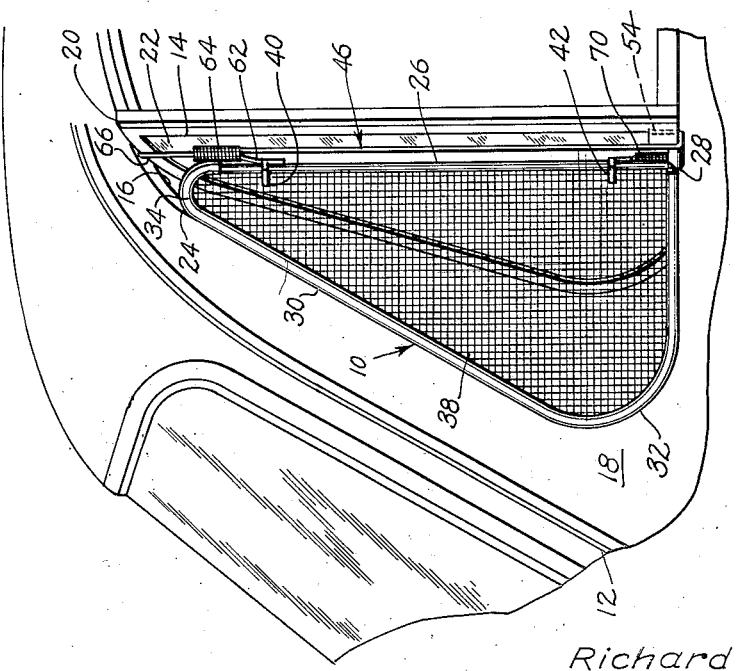
INVENTOR.
Richard J. Kulisch
BY
McMorrow, Berman + Davidson
ATTORNEYS Aug. 7, 1956 R. J. KULISCH 2,757,725
SCREEN FOR AUTOMOBILE DOOR WINDOW VENTS
Filed May 18, 1954 2 Sheets-Sheet 2
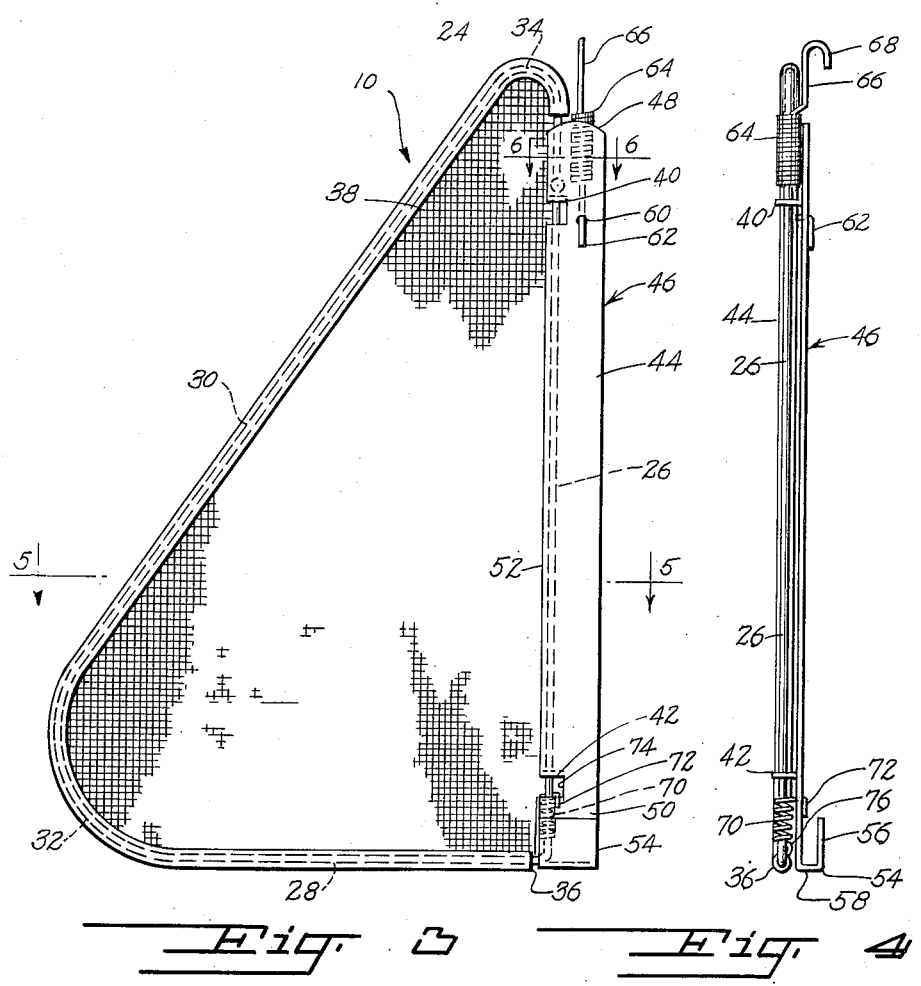
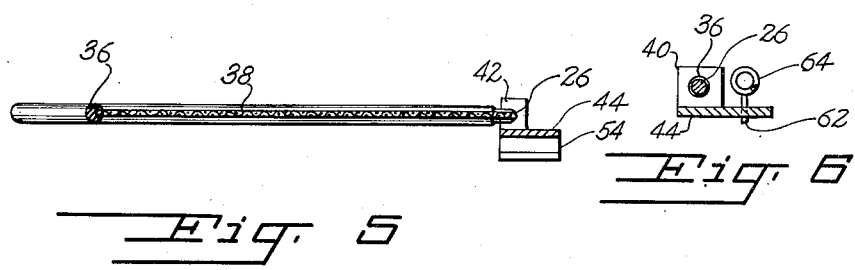
INVENTOR.
Richard J. Kulisch
BY
McMorrow, Berman & Davidson
ATTORNEYS

United States Patent Office 2,757,725
Patented Aug. 7, 1956

2,757,725

SCREEN FOR AUTOMOBILE DOOR WINDOW VENTS

Richard J. Kulisch, St. Louis, Mo.

Application May 18, 1954, Serial No. 430,485

4 Claims. (Cl. 160—93)

This invention relates to insect excluding screens for automobile windows, and more particularly to an insect and bug excluding screen for swiveled front windows in the doors of automobiles.

Thus, this invention is particularly applicable to the ventilating windows of the so-called "no-draft" type which are located in the forward portions of the door and in front of the door windows that move vertically. These ventilating windows are normally so mounted that they can be swung into a position where the forward portion thereof, that is the portion forwardly of the vertical pivots about which it is movable, will swing into the interior of the automobile body when the window is open while the portion rearwardly of the vertical axis swing outwardly.

When the ventilating window is so opened, air is deflected into the interior of the automobile and upon the driver and passengers therein. With the considerable volume of air deflected by the opened ventilating window into the automobile, hubs and insects are also deflected or blown into the interior of the automobile through the space between the window and the forward end of the window opening in which the window is mounted for movement about a vertical axis. The introduction of such insects into the interior of the automobile has in the past caused serious accidents by interference with the vehicle operator.

Therefore, it is the primary object of this invention to provide a screen for such automobile window vents whereby bugs, insects and other matter will be excluded from the interior of the automobile body through the vent opening when the ventilating window is opened to permit the cooling effect of the air deflected therethrough, to thereby obviate any danger to the vehicle operator occasioned by the introduction of bugs, insects or other matter through the vent opening.

It is a further object of this invention to provide a screen of the character adapted for use with the automobile ventilating window which may be readily attached and detached from such window and which will remain in closing relation to the vent opening at all times regardless of the angular position of the ventilating window with regard to the vent opening.

It is a further object of this invention to provide a screen for automobile window vents which may be readily shaped to meet the dimensional requirements of different makes of automobiles, and which is of simple structure, capable of economical manufacture at low cost and readily saleable as an automotive accessory.

Other objects and advantages will become apparent from a consideration of the following detailed description, forming the specification, and taken in conjunction with the accompanying drawings, in which:

Figure 1 is a fragmentary perspective view of an automobile body, showing the screen embodying this invention applied thereto, as viewed from a position slightly forwardly from the window opening at one side of the automobile;

Figure 2 is a fragmentary perspective view similar to Figure 1, but showing the ventilating window in its closed relation with the window opening in which it is mounted;

Figure 3 is a side elevational view of the screen itself, shown on a somewhat enlarged scale;

Figure 4 is an end elevational view of the screen shown in Figure 3 and looking to the left of Figure 3;

Figure 5 is a horizontal cross sectional view taken on line 5—5 of Figure 3; and Figure 6 is a sectional view taken on line 6—6 of Figure 3, and shown on a somewhat enlarged scale.

With continued reference to the drawings, the insect excluding screen, generally indicated at 10, is shown as being applied to an automobile body 12 having a ventilating window 14 disposed in the window opening 16 at the forward end of the front vehicle door 18, the window 14 having a frame 20 being provided with a pane of glass 22.

The ventilating window 14 is mounted in the window opening of the door 18 for movement in a vertical arcuate path about a vertical axes in the conventional manner.

The screen 10 comprises a frame 24 that is of substantially the shape of the opening in which the screen is to be located, being of a generally trianglar shape and having a vertical portion 26 that is straight, a bottom straight horizontal portion 28, and an inclined or obliquely extending portion 30 which is connected with the portion 28 by means of a curved portion 32, while a curved portion 34 connecting the converging ends of the portions 26 and 30 of the frame. A cover of compressible resilient material, such as rubber, covers the portions 28, 30, 32, and 34 of the frame, and this cover is indicated at 36.

The frame 24 is U-shape in cross section in which the screen material 38 may be mounted so as to extend within the opening defined by the frame and thereacross, the screen being a reticulated member of either wire or plastic material.

The frame 24 is pivotally carried by having its vertical portion 26 passing through aligned apertures in spaced parallel ears 40 and 42 struck out from and extending perpendicularly to the body 44 of a bracket, generally indicated at 46. The body 44 extends longitudinally of the vertical portion 26 of the frame 24 for substantially its entire length while the ears 40 and 42 have been punched out of the body adjacent the upper and lower ends 48 and 50 and along the longitudinal edge 52 which is disposed adjacent the vertical portion 26 of the frame 24.

The lower end 50 of the bracket 46 carries a hook member 54, preferably formed integrally with the body 44, with the inturned leg 56 being in spaced parallel relation to the body 44 and bent out from the bight 58 of the hook 54 to extend in a direction therefrom toward the upper end 48 of the body 44.

An opening 60 is provided through the body 44 adjacent the upper end 48 and spaced from the ear 40. One end 62 of a coil spring 64 is receivable within the opening 60 while the other straight end 66 of the spring is provided with a return bend hook 68 at the terminal end thereof remote from the body of the coil spring.

Thus, the screen 10 may be releasably secured upon the window frame 20 of the ventilating window 14 by having the bracket hook 54 engage the lower horizontal edge thereof while the hooked end 68 of the coil spring 64 will be engaged upon the upper end of the window 14, as shown in Figures 1 and 2, so that the screen 10 is resiliently secured, in a releasable manner, upon the ventilating window 14. Since the spring or resilient means 64 may be stretched, it will be apparent that the screen 10 can be readily adapted to be changed in shape to accommodate the ventilating window of different makes of the automobiles.

As clearly shown in Figures 1 and 2, the screen 10 will be disposed in the window opening forwardly of the vertical axis about which the ventilating window moves in an arcuate path, and outwardly of the window 14 in such manner that the portions 28 and 30 and the arcuate connecting portion 32 will rest against the door 18 adjacent the edges of the window opening in the door.

With the screen 10 releasably attached upon the ventilating window 14, in the manner hereinbefore described with its horizontally extending and inclined portions contacting the door 18, it will be apparent that the cover 36 will prevent marring or scratching of the finish of the automobile body or door at this point, or the points of contact therewith. To maintain the screen 10, and specifically the frame 24 thereof in the relation to the window opening as shown in Figures 1 and 2, so that the screen material or reticulated member 38 mounted in the frame in such position as to extend across the window opening so as to exclude insects, bugs and other material from the interior of the vehicle as the air is deflected therethrough by moving the ventilating window 14 in its arcuate path into opening relation with the window opening 16, there is provided a torsion spring 70 encirclingly carried by the vertical portion 26 of the frame 24 adjacent its lower end, or adjacent the juncture of the vertical portion 26 with the horizontally extending portion 28, with one end 72 being secured to the body 44 of the bracket 46 along the lower transverse edge of the recess 74 resulting from the ear 42 being punched out of the body 44 of the bracket. The other end 76 of the torsion spring 70 is secured to the vertically extending portion 26 of the frame 24 adjacent its juncture with the horizontally extending portion 28. Thus, it will be appreciated that the frame 24 is resiliently urged into engagement with the automobile door 18 adjacent the edges of the window opening therein.

Since the bracket 46 is pivotally connected to the frame 24, the bracket is free to move with the ventilating window 14 as the ventilating window is moved in its arcuate path about its vertical axis into opening or closing relation with the window opening 16.

While there are shown and described the preferred embodiment of the invention, it is to be understood that the structure is susceptible to change and modification within the practicability of the invention and therefore should be limited only by the scope of the claims appended hereto.

What is claimed is:

1. In an automobile door having a window opening and a window mounted in said opening for movement in an arcuate path about a vertical axis spaced from the forward end of said opening; a screen disposed in said opening forwardly of said vertical axis and outwardly of said window, said screen comprising an upstanding bracket releasably secured to said window adjacent and forwardly of said axis, a frame having a reticulated member mounted therein pivotally secured to said bracket, and resilient means carried by said frame and operatively connected to said bracket to urge said frame into engagement with the automobile door adjacent the edges of said window opening, said bracket movable with said window in its arcuate path, a spring having one end secured to said bracket adjacent its upper end and the other end of said spring in releasable engagement with the upper end of said window, and a hook carried by the lower end of said bracket for engagement with the lower end of said window.

2. In an automobile door having a window opening and a window mounted for movement in an arcuate path about a vertical axis spaced from the forward end of said opening; a screen disposed in said opening forwardly of said vertical axis and outwardly of said window; said screen comprising an upstanding bracket having an elongated body extending parallel to said axis and slightly spaced therefrom, a pair of spaced ears struck from said body and extending laterally therefrom, a hook carried by the lower end of said body for engagement with the lower end of said window, and a spring having one end secured to said body and its other end releasably engaged with the upper end of said window; a frame having a reticulated member mounted therein pivotally secured in said pair of ears of said bracket, and resilient means carried by said frame and operatively connected to said bracket to urge said frame into engagement with the automobile door adjacent the edges of the window opening therein, said bracket being movable with said window in the arcuate path thereof.

3. In an automobile door having a window opening and a window mounted for movement in an arcuate path about a vertical axis spaced from the forward end of said opening; a screen disposed in said opening forwardly of said vertical axis and outwardly of said window; said screen comprising an upstanding bracket having an elongated body extending parallel to said axis and slightly spaced therefrom, a pair of spaced ears struck from said body and extending laterally therefrom, a hook carried by the lower end of said body for engagement with the lower end of said window, and a spring having one end secured to said body and its other end releasably engaged with the upper end of said window; a frame having a reticulated member mounted therein pivotally secured in said pair of ears of said bracket, and resilient means carried by said frame and operatively connected to said bracket to urge said frame into engagement with the automobile door adjacent the edges of the window opening therein, said bracket being movable with said window in the arcuate path thereof, and a cover of deformable material carried by said frame to prevent scarring of said door against which said frame is resiliently urged.

4. In a screen attachment for an automobile window mounted to swing about a substantially vertical axis in a window opening of the automobile, an elongated bracket adapted to extend vertically alongside said window and including a hook member at one end engageable against one edge of said window; means at the other end of the bracket engageable over the opposite edge of the window and resiliently yieldable in the direction of the length of the bracket to adjustably extend the overall length of the bracket, said hook member and said means being respectively adapted to slide along their associated edges of said window, for corresponding slidable adjustment of the bracket upon the window in a direction transversely of the bracket; a frame shaped to fit snugly within said opening and pivotally connected at one side to the bracket for swinging movement upon the bracket about an axis paralleling the axis of the window; a resilient, yielding connection between the bracket and frame tensioned to bias the frame in one direction about its pivot axis to normally retain the same in a position extending across said opening on pivotal adjustment of the window about its axis to selected open positions; and a reticulated member mounted in said frame.

References Cited in the file of this patent

UNITED STATES PATENTS

| | | |
|---|---|---|
| 1,483,652 | Donigan | Feb. 12, 1924 |
| 1,982,455 | Sansbury | Nov. 27, 1934 |
| 2,139,156 | Gill | Dec. 6, 1938 |
| 2,528,786 | Roberts | Nov. 7, 1950 |
| 2,655,404 | Cash | Oct. 13, 1953 |